UNITED STATES PATENT OFFICE.

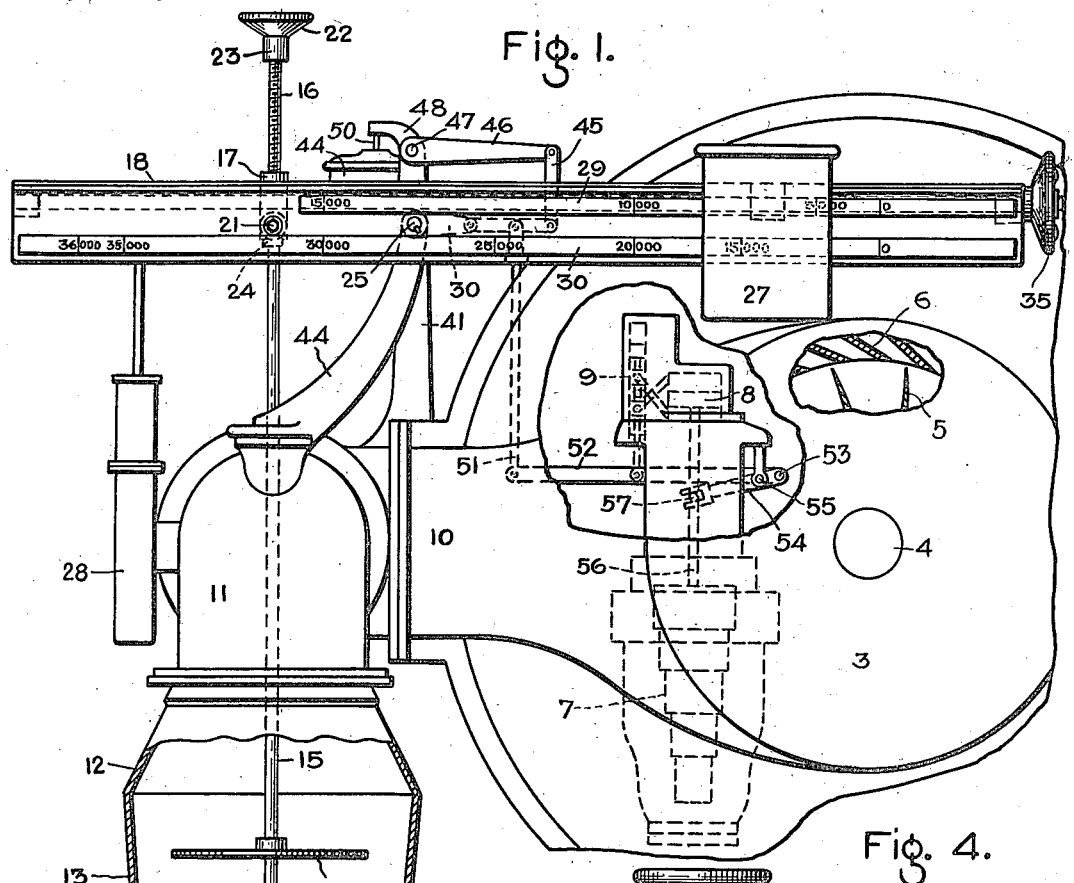
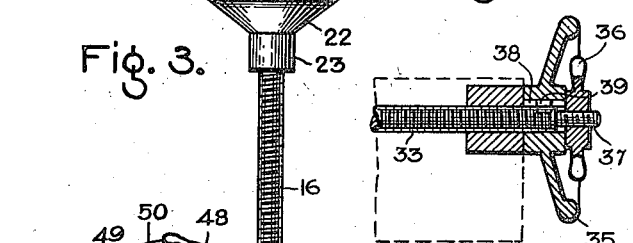
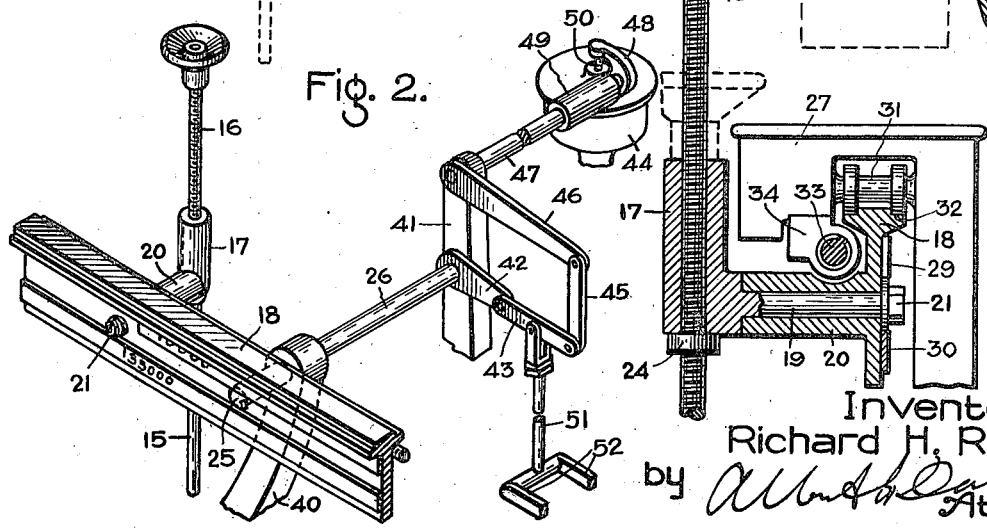

RICHARD H. RICE, OF LYNN, MASSACHUSETTS, ASSIGNOR TO GENERAL ELECTRIC COMPANY, A CORPORATION OF NEW YORK.

CONSTANT-VOLUME GOVERNOR.

1,250,015.　　　　Specification of Letters Patent.　　Patented Dec. 11, 1917.

Application filed March 28, 1916. Serial No. 87,193.

*To all whom it may concern:*

Be it known that I, RICHARD H. RICE, a citizen of the United States, residing at Lynn, county of Essex, State of Massachusetts, have invented certain new and useful Improvements in Constant-Volume Governors, of which the following is a specification.

The present application relates to constant volume governors for centrifugal compressors, and has for its object to provide an improved regulating mechanism, by means of which the compressor may be made to deliver widely varying volumes at constant pressure.

For a consideration of what I believe to be novel and my invention, attention is directed to the accompanying specification and the claims appended thereto.

In the accompanying drawing, Figure 1 is an end elevation of a motor driven compressor embodying my invention, parts being broken away for purposes of illustration; Fig. 2 is a detached perspective view of a leverage arrangement; and Figs. 3 and 4 are sectional views of details.

Referring to the drawing, 3 indicates a centrifugal compressor, for example an air compressor, having a shaft 4, impeller 5, and discharge vanes 6. In the present instance it is shown as being driven by an elastic fluid turbine, 7 indicating the regulating valve mechanism of the turbine, and 8 a fluid motor having a pilot valve 9, for actuating the valve mechanism. 10 indicates the inlet conduit for the compressor. The exhaust conduit does not show in the drawing, but it will be understood that the compressor is of a usual type. Connected with the inlet conduit by an elbow 11 is an enlargement comprising two conical members 12 and 13 having their large ends united. Within the enlargement and arranged to float or ride on the incoming fluid is a float 14 carried by a stem 15 which projects out through the elbow 11. The upper end of the stem is threaded as indicated at 16 and engages with a threaded nut 17 which is pivotally connected to a beam 18. As shown in Fig. 3 the nut 17 has a pin 19 which projects through a sleeve 20 on the beam and is held in place by a nut 21. The upper end of stem 16 carries a hand wheel 22 for turning it. The hub 23 on the hand wheel acts as a stop to limit the downward movement of the stem. On the stem below the nut 17 is an adjustable stop 24 to limit the movement of the stem in the other direction. The beam 18 is fixed at 25 on a shaft 26 and carries an adjustable weight 27. 28 is a suitable dash-pot connected to the beam 18, and 29 and 30 are two scales on the beam to guide the attendant in adjusting the weight. The weight 27 may be moved along the scale beam 18 in any suitable manner. In the present instance it is supported on the beam by a roller 31 which runs in grooves 32 in the top face of the beam, and is moved along the beam by a threaded rod 33 which passes through a threaded opening in a lug 34 on the weight. The rod 33 is journaled in the two ends of the beam and is fixed against longitudinal movement. It is turned by a hand wheel 35 held in place on the end of the rod by a wing nut 36 which screws on to the reduced threaded end 37 of the rod. The hand wheel has a longitudinal groove 38 (Fig. 4) in which a key 39 fixed to the rod 33 slides. This permits the hand wheel to slide longitudinally on the rod between the end of the beam and the wing nut 36, but fixes it against circumferential movement relative to the rod. This arrangement forms a locking means for locking the weight 27 in any adjusted position, for when the wing nut 36 is screwed down against the hand wheel it clamps the hand wheel against the end of the beam and prevents its turning. The shaft 26 on which the beam 18 is carried is journaled in supporting posts 40 and 41 mounted on stationary parts of the machine. Fixed on the shaft 26 is an arm 42 connected to one end of a floating lever 43. The other end of lever 43 is connected to a speed governor 44 by link 45, arm 46, rod 47, and arm 48. The rod 47 is pivoted in the supporting post 41 and in a sleeve 49 on the governor casing, and arms 46 and 48 are fixed to it. 50 indicates the spindle of the governor which engages the end of arm 48 to move it. The floating lever 43 is connected to the stem of pilot valve 9 of the fluid motor 8 by rod 51 and lever 52, which is pivoted at 53 on the end of a lever 54. The lever 54 has a fixed pivot 55 and has its other end connected to the stem 56 of the valve mechanism as shown at 57.

In operation the float is adjusted to either its full line or dotted line position, according to the amount of fluid to be delivered. In the upper position, i. e., the full line position of the drawing, the float corresponds to the lower scale, and in the lower position to the upper scale. In the present instance the lower scale is shown as being graduated for flows of from 0 to 36,000 cubic feet per minute, and the upper scale is shown as being graduated for flows of from 0 to 15,000 cubic feet per minute. After the float is adjusted, the weight 27 is then set at the desired point on the corresponding scale to give the volume of flow desired. If the flow tends to increase, the float will be raised, thus tilting the beam 18 on its pivot shaft 26. This turns the arm 42 and lowers the left-hand end of floating lever 43, the same pivoting on the link 45, which is held stationary by the speed governor. The lever 43 moves rod 51, and through lever 52 lowers the pilot valve 9, the lever 52 pivoting at 53. The pilot valve then admits motive fluid above the piston of the fluid motor 8 in the usual and well known manner, causing it to move downward and close off slightly the valve mechanism 7. The movement of the valve mechanism 7 returns the pilot valve to its original position, since by such movement it turns the lever 54 on its pivot 55 and thus lifts the right-hand end of floating lever 52, which now pivots on rod 51. This, as will be readily recognized, forms a usual form of follow-up device.

In case of a diminution in the flow, the float will lower slightly and the same operation will take place as just described, except in the opposite sense.

The speed governor 44 is not a governor in the usual sense, but is more in the nature of an emergency or speed limiting device. It is so set that so long as the speed does not exceed a certain predetermined maximum, it has no effect on the regulating mechanism, the same being wholly controlled by the volume governor. In case, however, the predetermined maximum speed is exceeded, then the governor takes control and prevents it from becoming excessive.

The zero positions of the two scales are at the same point, but for small flows, in the present instance, for example, flows of 15,000 or less, the float cannot be used when adjusted to the upper position corresponding to the lower scale, because in such upper position the small quantity of air being handled is not sufficient to effect its accurate operation. This is due to the fact that in the upper position of the float the space between its periphery and the wall of the conical section 13 is of so great an area that the smaller quantities of air do not have sufficient effect on the float to operate it. When it occupies a lower position in the conical section, the area between its periphery and the wall of such section is materially decreased, so that the incoming air when in small quantities acts on the float sufficiently to effect the regulation of the machine.

By my improved arrangement, therefore, I provide a volume governing mechanism for a compressor which can be adjusted so that the compressor may be used to deliver volumes of flow varying through a much wider range than has previously been capable of accomplishment.

Furthermore, by providing the two stops 23 and 24, the adjusting of the float for either scale becomes a simple matter and does not require the services of a skilled operative. Once the stops are correctly adjusted, they need not be changed.

While I have shown the float as being fixed on the rod, and the rod adjustably connected to the beam, this being the preferred form of my invention, it will be understood that my invention is not necessarily limited to this arrangement, as any other arrangement which adjusts the float relative to the conical section may be used.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is:—

1. The combination of a compressor having an inlet conduit and a discharge conduit, a motor for driving the compressor, regulating means for the motor, a tilting beam connected to the regulating means, a plurality of scales, an adjustable weight on the beam coöperating with the scales, a float in the inlet conduit, means connecting it to the tilting beam, and means for adjusting the float to different positions in the inlet conduit to correspond to the respective scales.

2. The combination of a compressor having an inlet conduit, a section of which is conical in shape, a motor for driving it, regulating mechanism for the motor, a pivoted beam connected to the regulating mechanism, a plurality of scales on the beam, an adjustable weight on the beam coöperating with the scales, a float in the conical section, means connecting it to the beam, and means for adjusting it to the different positions in the conical section to correspond to the respective scales.

3. The combination of a compressor having an inlet, a section of which is conical in shape, a motor for driving it, regulating mechanism for the motor, a pivoted beam connected to the regulating mechanism, a plurality of scales on the beam, an adjustable weight on the beam coöperating with the scales, a float in the conical section, a rod connecting it to the beam, and means whereby the rod may be adjusted to bring the float to different positions in the conical section to correspond to the respective scales.

4. The combination of a compressor having an inlet, a section of which is conical in shape, a motor for driving it, regulating mechanism for the motor, a pivoted beam connected to the regulating mechanism, a plurality of scales on the beam, an adjustable weight on the beam coöperating with the scales, a float in the conical section, a rod connecting it to the beam, means whereby the rod may be adjusted to bring the float to different positions in the conical section to correspond to the respective scales, and stops on the rod for fixing the extent of its movements.

5. The combination of a compressor having an inlet, a section of which is conical in shape, a motor for driving it, regulating mechanism for the motor, a pivoted beam connected to the regulating mechanism, a plurality of scales on the beam, an adjustable weight on the beam coöperating with the scales, a float in the conical section, means connecting it to the beam, means for adjusting it to different positions in the conical section to correspond to the respective scales, and stops for limiting the adjusting movements of the float.

In witness whereof I have hereunto set my hand this twenty fourth day of March, 1916.

RICHARD H. RICE.